(12) United States Patent
Frank

(10) Patent No.: US 7,742,788 B2
(45) Date of Patent: Jun. 22, 2010

(54) METHOD AND APPARATUS FOR USING SWITCHED MULTIBEAM ANTENNAS IN A MULTIPLE ACCESS COMMUNICATION SYSTEM

(75) Inventor: Colin Frank, Park Ridge, IL (US)

(73) Assignee: Motorola, Inc., Schaumburg, IL (US)

( * ) Notice: Subject to any disclaimer, the term of this patent is extended or adjusted under 35 U.S.C. 154(b) by 1039 days.

(21) Appl. No.: 10/670,577

(22) Filed: Sep. 25, 2003

(65) Prior Publication Data

US 2004/0063468 A1 Apr. 1, 2004

Related U.S. Application Data

(60) Provisional application No. 60/415,289, filed on Oct. 1, 2002.

(51) Int. Cl.
*H04M 1/00* (2006.01)
(52) U.S. Cl. .................. 455/562.1; 455/25; 455/63.4
(58) Field of Classification Search .............. 455/562.1, 455/25, 63.4
See application file for complete search history.

(56) References Cited

U.S. PATENT DOCUMENTS

| | | | | |
|---|---|---|---|---|
| 5,893,033 | A | * | 4/1999 | Keskitalo et al. ............. 455/437 |
| 5,920,813 | A | * | 7/1999 | Evans et al. .............. 455/422.1 |
| 6,005,516 | A | | 12/1999 | Reudink et al. |
| 6,360,107 | B1 | * | 3/2002 | Lin et al. .................. 455/562.1 |
| 6,574,271 | B2 | * | 6/2003 | Mesecher et al. ........... 375/148 |
| 6,768,913 | B1 | * | 7/2004 | Molnar et al. ............. 455/562.1 |
| 6,771,987 | B1 | * | 8/2004 | Dam et al. ................ 455/562.1 |
| 2002/0086708 | A1 | * | 7/2002 | Teo et al. ..................... 455/561 |
| 2002/0128027 | A1 | | 9/2002 | Wong et al. |
| 2002/0135516 | A1 | * | 9/2002 | Sollenberger et al. ....... 342/387 |

FOREIGN PATENT DOCUMENTS

| | | |
|---|---|---|
| EP | 1039663 A1 | 9/2000 |
| EP | 1343339 A2 | 9/2003 |
| WO | 0154301 A2 | 7/2001 |

OTHER PUBLICATIONS

3rd Generation Partnership Project (3GPP): "Technical Specification Group Radio Access Network, Physical layer aspects of UTRA High Speed Downlink Packet Access (3GPP TR 25.848 version 4.0.0 Release 4)" ESTI Standards, [Online] vol. v4.0.0, Mar. 2001, Sophia Antipolis, France, pp. 10, 17-20, 47-52, 73.

* cited by examiner

*Primary Examiner*—Yuwen Pan
(74) *Attorney, Agent, or Firm*—Steven A. May

(57) ABSTRACT

In order to increase a capacity, or a number of mobile stations (MSs), or users, that may engaged in concurrent communication sessions, a communication system is provided that schedules a different MS, or user, in each beam of multiple predetermined, fixed beams associated with a coverage area, in particular a sector. By simultaneously scheduling a user in each beam of the multiple beams, a performance and throughput of communication system is significantly increased over the prior art. In one embodiment of the present invention, a portion of a shared communication channel that is allocated to each MS is concurrently transmitted to each MS via a beam associated with the MS. In other embodiments of the present invention, voice channels, data channels, and control channels associated with each MS scheduled in a beam may be concurrently transmitted to each MS via the beam associated with the MS.

26 Claims, 6 Drawing Sheets

METHOD AND APPARATUS FOR USING SWITCHED MULTIBEAM ANTENNAS IN A MULTIPLE ACCESS COMMUNICATION SYSTEM

REFERENCE(S) TO RELATED APPLICATION(S)

The present application claims priority from provisional application, Ser. No. 60/415,289, entitled "METHOD AND APPARATUS FOR USING SWITCHED MULTIBEAM ANTENNAS IN A MULTIPLE ACCESS COMMUNICATION SYSTEM," filed Oct. 1, 2002, which is commonly owned and incorporated herein by reference in its entirety.

FIELD OF THE INVENTION

The present invention relates to wireless telecommunication systems, and more particularly to the use of switched multibeam antennas in wireless telecommunication systems.

BACKGROUND OF THE INVENTION

An important goal in designing a wireless communication system is to maximize system capacity, that is, to maximize a number of users that may simultaneously be served by the communication system. One way of increasing system capacity is to use a smart antenna system. Smart antenna systems use an array of antenna elements to wirelessly transmit information to a target mobile station (MS). The use of an array of antenna elements allows a transmitted signal to be beamformed so that a narrower, more focused beam is transmitted to the MS. That is, by adjusting the amplitudes and phases of the signals conveyed to each antenna element, a desired beam may be formed. By beamforming the transmitted signal, multipath fading of the transmitted signal and interference with non-targeted users is reduced since the beam is more narrowly focused.

There are two primary types of smart antenna systems, switched beam antenna systems and adaptive antenna systems. In a cellular communication system, a switched beam antenna system comprises a use of multiple predetermined, fixed beams in a sector of a cell. The outputs of the multiple antenna elements of the switched beam antenna system are combined in such a way as to form narrow, directional beams that are spatially selective. As a target MS moves through the sector, the switched beam system switches the information intended for the MS from one beam to another. That is, when the MS is in a first beam of the multiple beams, all of the transmit power available in the sector is allocated to the first beam. When the MS is in a second beam of the multiple beams, all of the transmit power available to the sector is allocated to the second beam.

By confining the signal transmitted to a particular MS to a beam containing the MS, system performance is improved since confinement of the transmitted signal to the correct beam reduces interference observed by other mobile stations not in this beam. In addition, confinement of the signal transmitted to a particular MS to a beam containing the MS permits a reduction in transmit power, and concomitantly in interference observed by the other mobile stations. As a result, system capacity is improved since the reduction in interference permits increased frequency reuse, in a Time Division Multiple Access (TDMA) communication system, or orthogonal code reuse, in a Code Division Multiple Access (CDMA) communication system.

However, utilization of a switched beam antenna system to focus a beamed signal upon a target MS moving through a sector only begins to address the issue of increasing system capacity, which is a continuing constraint upon operation of wireless communication systems. Therefore, a need exists for a method and apparatus for obtaining additional capacity improvements through utilization of a switched beam antenna system in a wireless communication system.

DETAILED DESCRIPTION OF THE INVENTION

In order to obtain additional capacity improvements through utilization of a switched beam antenna system in a wireless communication system, a communication system is provided that schedules a different MS, or user, in each beam of multiple predetermined, fixed beams associated with a coverage area, in particular a sector. By simultaneously scheduling a user in each beam of the multiple beams, a performance and throughput of communication system is significantly increased over the prior art. In one embodiment of the present invention, a portion of a shared communication channel that is allocated to each MS is concurrently transmitted to each MS via a beam associated with the MS. In other embodiments of the present invention, voice channels, data channels, and control channels associated with each MS scheduled in a beam may be concurrently transmitted to each MS via the beam associated with the MS.

Generally, an embodiment of the present invention encompasses a method for conveying user information to each mobile station of multiple mobile stations in a communication system that includes the multiple mobile stations and a switched beam antenna system, wherein the switched beam antenna system comprises an infrastructure and a multiple beams for conveying user information from the infrastructure to the multiple mobile stations. The method comprises a step of scheduling a different mobile station of the multiple mobile stations for substantially simultaneous use of each beam of the multiple beams.

Another embodiment of the present invention encompasses a base station subsystem capable of operating in a communication system comprising a switched beam antenna system that generates a plurality of predetermined, fixed beams. The base station subsystem comprises an antenna array comprising multiple array elements, multiple weighters, wherein each weighter of the multiple weighters is coupled to an element of the multiple elements, and a processor coupled to each weighter of the plurality of weighters. The processor conveys a first set of weighting coefficients to the weighters for a conveyance of information to a first mobile station of multiple mobile stations and further conveys a second set of weighting coefficients to the weighters for a conveyance of information to a second mobile station of the multiple mobile stations, wherein the first set of weighting coefficients are utilized by the weighters to transmit a first beam of the plurality of beams to the first mobile station and wherein the second set of weighting coefficients are utilized by the weighters to transmit a second beam of the plurality of beams to the second mobile station.

Figure 1:
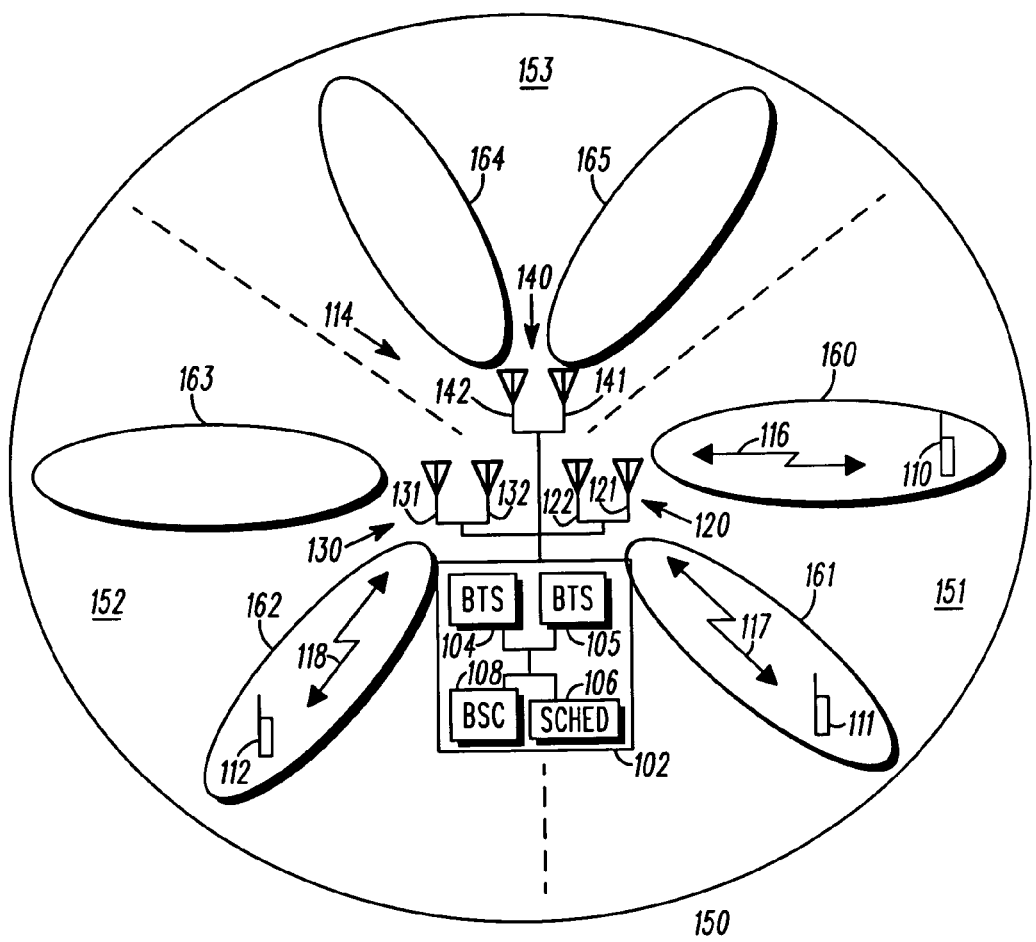
FIG. 1 is a block diagram of a communication system in accordance with an embodiment of the present invention.

The present invention may be more fully described with reference to FIGS. 1-7. FIG. 1 is a block diagram of a wireless communication system 100 in accordance with an embodiment of the present invention. Communication system 100 includes a fixed wireless infrastructure that includes a base station subsystem (BSS) 102. BSS 102 provides communications service to each of multiple mobile stations (MSs) 110-112 located in a service coverage area, or cell, 150 serviced by the BSS. Cell 150 is divided into multiple geographic sectors 151-153 (three shown). BSS 102 includes multiple base transceivers stations (BTSs) 104, 105 (two shown) that are each coupled to an antenna 114 via a duplexer. Each BTS 104, 105 provides communication services to an MS 110-112 located in a sector 151-153 of the cell 150 serviced by the BTS via a respective air interface 116-118. Each air interface 116-118 includes multiple communication channels, including at least one packet data channel, a shared packet data channel, a pilot channel, a paging channel, and a synchronization channel.

Antenna 114 is a directional antenna that is divided into multiple antenna sectors 120, 130, 140, (three shown), wherein each sector of the multiple antenna sectors corresponds to, and provides communications service to, a respective geographic sector of the multiple geographic sectors 151-153. Each antenna sector 120, 130, 140, comprises an antenna array that includes multiple antenna elements (two shown for each array). For example, antenna sector 120 includes antenna elements 121-122, antenna sector 130 includes antenna elements 131-132, and antenna sector 140 includes antenna elements 141-142. By utilizing an antenna array to transmit signals to an MS located in the sector serviced by the antenna array, BSS 102 is able to utilize a switched beam beamforming technique for the transmission of the signals. For example, as depicted in FIG. 1, each sector 151-153 is associated with multiple fixed, predetermined beams 160-165, that is, sector 151 is associated with beams 160 and 161, sector 152 is associated with beams 162 and 163, and sector 153 is associated with beams 164 and 165; however, those who are of ordinary skill in the art realize that the number of beams associated with each sector is arbitrary and within the discretion of a designer of communication system 100. Each of beams 160-165 is predetermined and fixed, as opposed to being adaptively shaped and directed, and is used by BSS 102 to transmit signals an MS included in the beam.

BSS 102 further includes a scheduler 106 and a base station controller (BSC) 108 that are each coupled to each BTS 104, 105 in BSS 102. In another embodiment of the present invention, scheduler 106 may be included in BSC 108. Scheduler 106 determines an optimal beam of the multiple beams 160-165 utilized by BSS 102, that is, by a BTS 104 of BSS 102, to transmit a signal to an MS serviced by the BTS.

Preferably, communication system 100 is a Code Division Multiple Access (CDMA) communication system that includes multiple orthogonal communication channels, although those who are of ordinary skill in the art realize that that the present invention may be utilized in any wireless communication system, such as a time division multiple access (TDMA) communication system or an orthogonal frequency division multiplexing (OFDM) communication system. Preferably, each communication channel of the multiple communication channels comprises one or more of multiple orthogonal spreading codes, such as Walsh codes. The use of spreading codes permits the coexistence of multiple communication channels in the same frequency bandwidth.

Figure 2:
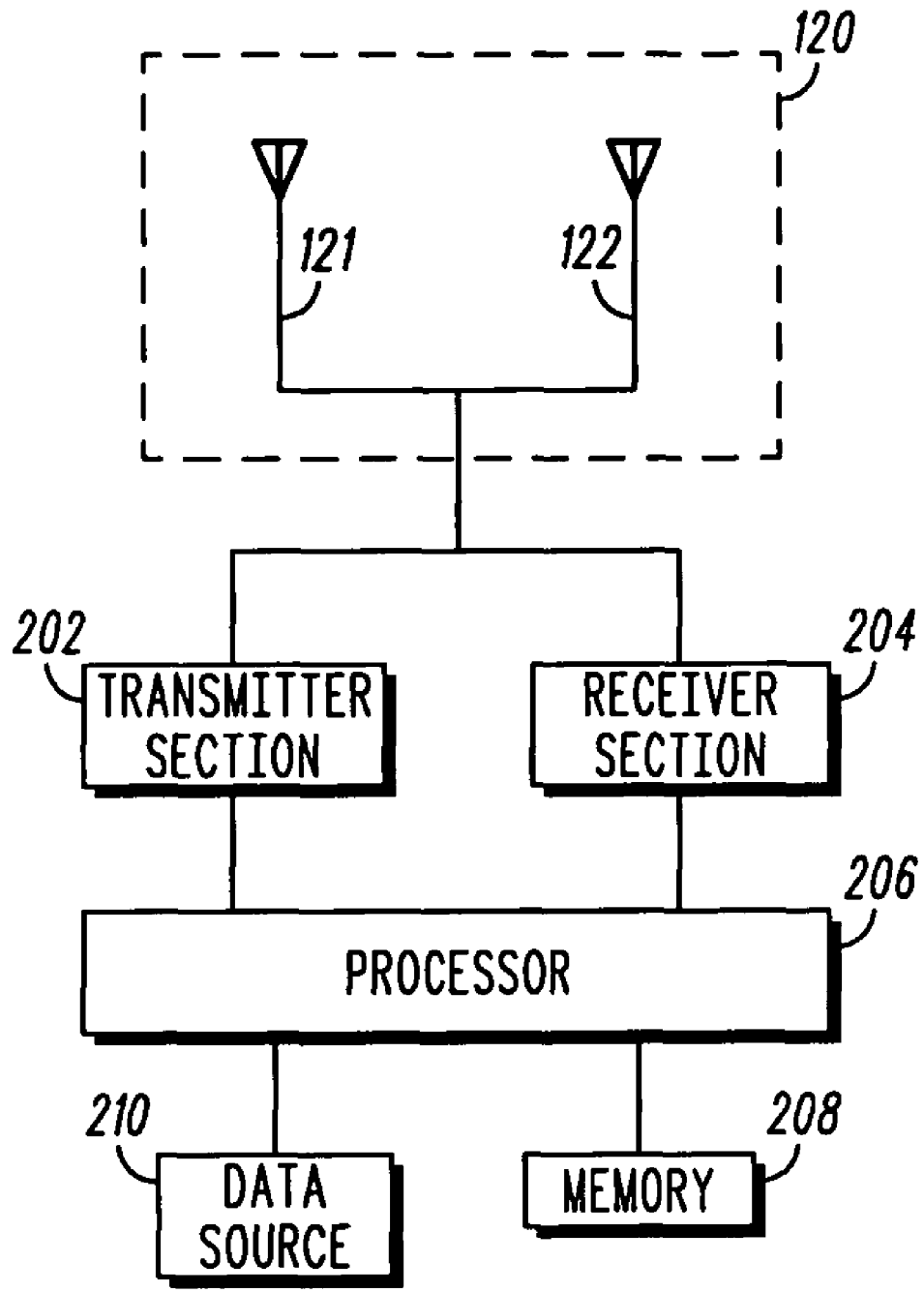
FIG. 2 is a block diagram of a transmitting communication device in accordance with an embodiment of the present invention.

FIG. 2 is a block diagram of a BTS 104, 105 in accordance with an embodiment of the present invention. Each BTS 104, 105 is coupled to at least one antenna array 120, 130, 140 associated with BSS 102, such as array 120, and includes a transmitter section 202 and a receiver section 204 that are each coupled to the array via a duplexer (not shown). Each of transmitter section 202 and receiver section 204 are further coupled to a processor 206, such as one or more microprocessors, microcontrollers, digital signal processors (DSPs), combinations thereof or such other devices known to those having ordinary skill in the art. Processor 206 is further coupled to, and/or includes, one or more associated memory devices 208, such as random access memory (RAM), dynamic random access memory (DRAM), and/or read only memory (ROM) or equivalents thereof, that store data and programs that may be executed by the processor. Processor 206 and associated memory devices 208 allow BTS 104 to store information, make computations, and run software programs.

Figure 3:
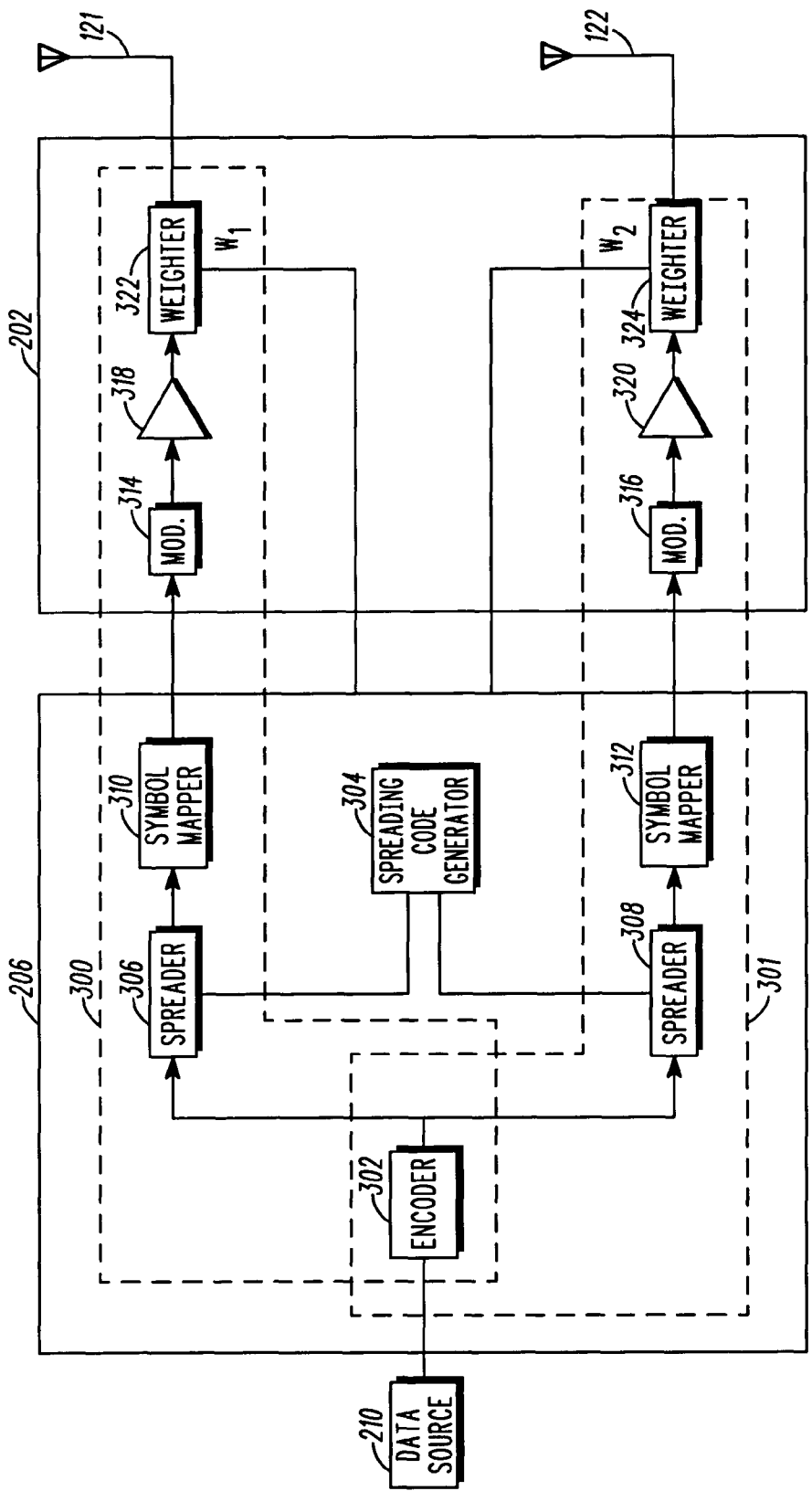
FIG. 3 is a block diagram of multiple transmitted signal paths of a transmitting communication device in accordance with an embodiment of the present invention.

FIG. 3 is a block diagram of multiple transmitted signal paths 300, 301 of each BTS 104, 105 in accordance with an embodiment of the present invention. Each transmitted signal path 300, 301 corresponds to one of the multiple array elements, such as array elements 121 and 122, of an antenna array associated with the BTS, such as antenna array 120. Data is sourced to BTS 104 by a data source 210, such as an interface with an external network, such as a public switched telephone network (PSTN) or the Internet, or an application running on processor 206 of the BTS.

Data source 210 is coupled to processor 206. As depicted in FIG. 3, processor 206 includes an encoder 302, multiple spreaders 306, 308, and multiple symbol mappers 310, 312. Encoder 302 receives data from data source 210 and encodes the data utilizing a predetermined coding scheme, such as a block coding scheme or a convolutional coding scheme. Encoder 302 then conveys the encoded data to each of multiple spreaders 306, 308. In another embodiment of the present invention, processor 206 may further include an interleaver that interleaves the encoded data prior to the encoded data being conveyed to multiple spreaders 306, 308.

Each spreader of the multiple spreaders 306, 308 is coupled to a spreading code generator 304 and spreads the encoded data pursuant to a spreading code, preferably a Walsh code, provided by the spreading code generator. The spreading code generated by spreading code generator 304 is dependent upon the MS for which the data is intended, as BSS 102 assigns different spreading codes to each MS located in a same sector of the multiple sectors 151-153. Each spreader 306, 308 then conveys the spread data to a respective symbol mapper of the multiple symbol mappers 310, 312. Each symbol mapper 310, 312 maps the data to one of multiple symbols included in a constellation of symbols to produce a symbol stream corresponding to the modulated data. In one embodiment of the present invention, symbol mappers 310, 312 utilize a quadrature amplitude modulation (QAM) mapping scheme for mapping the data. However, the mapping scheme used is not critical to the present invention and those who are of ordinary skill in the art realize that a wide variety of mapping schemes, such a binary phase shift keying (BPSK) or quadrature phase shift keying (QPSK), may be used herein without departing from the spirit and scope of the present invention. After modulation of the data by a symbol mapper 310, 312, the modulated data is conveyed by processor 206 to transmitter section 202 for transmission.

Transmitter section 202 includes multiple modulators 314, 316 that are each coupled to one of multiple amplifiers 318, 320. Transmitter section 202 further includes multiple weighters 322, 324 that are each coupled between one of the multiple amplifiers 318, 320 and one of the multiple antennas 121, 122 and are further coupled to processor 206. Each modulator of the multiple modulators 314, 316 receives modulated data from a respective symbols mapper 310, 312 and modulates the modulated data onto a radio frequency (RF) carrier. Each modulated carrier is then conveyed to an amplifier 318, 320 coupled to the respective modulator 314, 316 that amplifies the modulated carrier produce an amplified signal and conveys the amplified signal to a respective weighter 322, 324. Each weighter 322, 324 modulates the amplified signal based on a weighting coefficient provided to the weighter by processor 206 and transmits the weighted signal via a respective antenna 121, 122. In other embodiments of the present invention, each weighter 322, 324 may be interposed between a modulator 314, 316 and an amplifier 318, 320, or may precede modulators 314, 316 and be located in processor 206.

In order to optimize a strength of an RF signal received by a target MS, such as MS 110, from a BTS 104, 105 servicing the MS, and to minimize the interference of the RF signal with communications between the BTS and other active MSs in the sector serviced by the BTS, each BTS 104, 105 employs a switched beam beamforming technique for the transmission of the RF signal. The switched beam beamforming technique allows the BTS to transmit a narrowly focused signal to target MS 110 based on weighting coefficients assigned by the BTS to each element 121, 122 of the antenna array 120 associated with the BTS.

Current and proposed Code Division Multiple Access (CDMA) communication systems, such as a 1XEV-DV (Data and Voice) system and a HSDPA (High Speed Downlink Packet Access) system, each includes multiple communication channels in the air interface between an MS and a BSS. Among the multiple channels is a shared communication channel, that is, a shared packet data channel, that may be shared among multiple MSs that are serviced by the same BSS. In accordance with the 1XEV-DV and HSDPA standards, communication system 100, and in particular scheduler 106, preferably uses a Carrier-to-Interference ratio (C/I) feedback from the MSs in order scheduling a use of the shared packet data channel by an MS 110-112. In scheduling operation for the shared packet data channel, scheduler 106 considers (1) choosing which MS of the multiple MSs to schedule for use of the shared packet data channel; (2) selecting the encoder packet size(s) for the MS; and (3) selecting a number of Walsh codes to be allocated to the MS. The shared packet data channel in 1xEV-DV can be code multiplexed between two users (2-user CDM), while the shared packet data channel for HSDPA can be code multiplexed between four users (4-user CDM). Although the discussion below will only address the 2-user CDM supported by 1xEV-DV, one of ordinary skill in the art realizes that the concepts discussed also apply to the 4-user CDM case.

C/I feedback can be determined as follows. Each MS of the multiple MSs 110-112 measures a propagation channel between the MS and an array element of BSS 102 by correlating a signal received from the element with a known version of the signal. For example, BSS 102 may transmit, via the element, a pilot code, such as a predetermined pilot Walsh code, or a sequence of pilot symbols that is known to the MS and that is assigned to the element. When the MS receives the transmitted signal, the MS correlates the received signal with the known pilot code or symbols. Based on the comparison, the MS then determines the signal distortion attributable to the channel.

Measuring the autocorrelation of the background interference is somewhat more difficult. In one embodiment of the present invention, each MS 110-112 measures the autocorrelation of the background interference by demodulating a signal received from BSS 102 and subtracting the demodulated signal from an arriving signal. The resulting signal consists only of background interference, and the autocorrelation of this signal can be readily obtained by correlating the signal against itself. In another embodiment of the present invention, the MS may measure the autocorrelation by BSS 102 periodically blanking its transmitted signal for short intervals of time. During the brief intervals in which the transmitted signal is turned off, the received signal consists only of background interference. Again, the interference autocorrelation can be measured by correlating the signal against itself.

In yet another embodiment of the present invention, each MS 110-112 may measure the autocorrelation of the background interference by measuring the correlation of a received signal that is transmitted by BSS 102 (by correlating the signal against itself). This correlation is the sum of the signal correlation function and the interference correlation function. The MS transmits both the channel propagation information and the received signal correlation function to BSS 102, that is, to the BTS servicing the MS. BSS 102, preferably processor 206 of a BTS serving the MS, computes the signal correlation for the transmitted signal, as observed at the MS, based on knowledge of both the propagation channel and the transmitted signal (e.g., a pilot signal). The interference correlation is then obtained by subtracting the computed correlation for the transmitted signal from the correlation function of the received signal.

With knowledge of the propagation channels between each of the multiple array elements of BSS 102 and each of the multiple MSs 110-112 serviced by the BSS, and the interference environment at each MS, BSS 102 determines the signal-to-noise ratio (SNR) at each MS serviced by the BSS for any power allocation and further determines a set of weighting coefficients from among multiple sets of weighting coefficients that respectively correspond to the multiple fixed beams associated with the sector where the MS is located. For example, a memory devices 208 of a BTS servicing an MS may store multiple sets of weighting coefficients, wherein each set of weighting coefficients of the multiple sets of weighting coefficients corresponds to a beam of multiple beams associated with the sector serviced by the BTS. Processor 206 of the BTS then selects a set weighting coefficients that yield a maximum SNR, although other criteria for selecting a set weighting coefficients are known to those of ordinary skill in the art and may be utilized herein without departing from the spirit and scope of the present invention. When a BTS, such as BTS 104, then transmits a signal to a MS serviced by the BTS, processor 206 of the BTS conveys the appropriate weighting coefficients to weighters 322, 324 of the BTS. Each weighter 322, 324 then uses the weighting coefficient conveyed to the weighter by processor 206 to modulate the signal being transmitted over the corresponding antenna array element, which signal is then transmitted in of the multiple fixed, predetermined beams via the corresponding array element.

Figure 4:
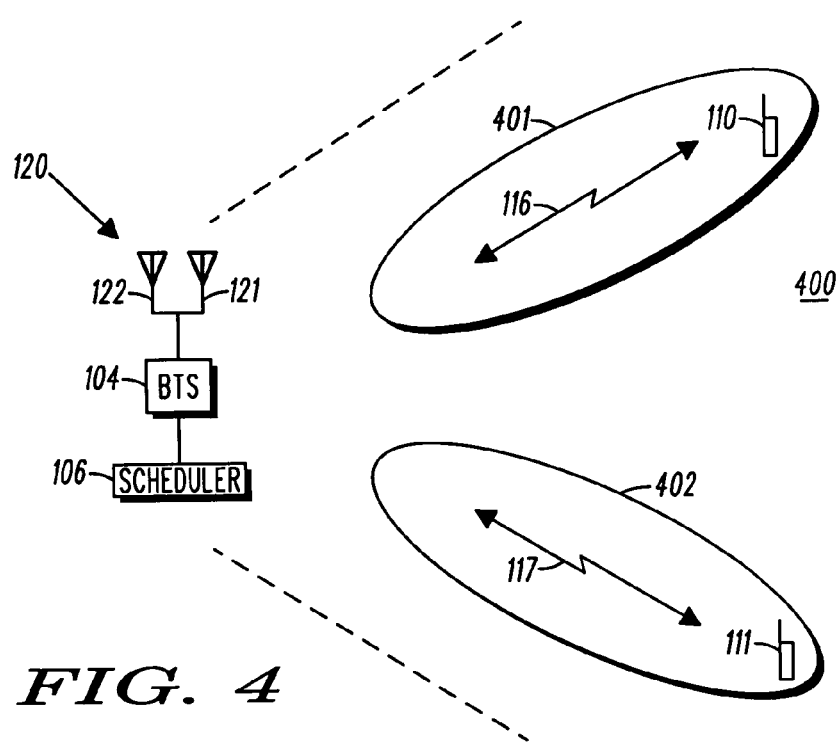
FIG. 4 is a block diagram of a sector of communication system in accordance with another embodiment of the present invention.

Referring now to FIG. 4, a block diagram of a sector 400, such as sectors 151-153, of communication system 100 is illustrated in accordance with an embodiment of the present invention. Sector 400 in includes multiple beams 401, 402 (two shown) that are transmitted by an antenna array, such as antenna arrays 120, 130, and 140, and a BTS 104 associated with the sector. The air interface between the BTS servicing the sector and each of the MSs located in the sector, that is, MSs 110 and 111, includes a shared packet data channel, like that in 1xEV-DV, that supports two-user Code Division Multiplexing (CDM) and is shared among the two users, or MSs.

In order to increase a capacity, or a number of users simultaneously engaged in communication sessions, of communication system 100, the communication system, and in particular scheduler 106, schedules a different MS, or user, in each beam of the multiple beams 401, 402 in sector 400. By simultaneously scheduling a user in each beam of the multiple beams 401, 402, a performance and throughput of communication system 100 is significantly increased over the prior art. In a first embodiment of the present invention, only a shared communication channel, such as a shared packet data channel, is used to convey user information to the MSs 110, 111 located in sector 400, and there is no 1X voice or data on an associated carrier. Let $\gamma_{1,p}$ denote a pilot C/I for a first MS, such as MS 110, located in a first beam, such as beam 401, and let $\gamma_{2,p}$ denote a pilot C/I for a second MS, such as MS 111, located in a second beam, such as beam 402. Let $N_{PDCH}$ denote the number of Walsh codes allocated to the shared communication channel, let P denote the total transmit power allocated to sector 400, and let $f_0$ denote the fraction of the total power allocated to overhead channels, such as pilot, paging, and synchronization channels.

In order to preserve the integrity of the C/I feedback, assume that the transmitted power in each of beams 401 and 402 is both equal and constant. Thus the power allocated to each of beams 401 and 402 is P/2. In this way, the C/I information at each of the associated MSs 110 and MS 111 varies only as a function of the fading, and not due to fluctuations in the transmitted power.

If only a single MS, or user, is scheduled at a time in a sector and the signal intended for the MS is transmitted over both of the sector's beams (or transmitted only over the scheduled user's beam with CDMA noise of equal power transmitted over the other), the maximum sector capacity that can be achieved is given by $$\text{Capacity} = N_{PDCH}\log_2\left(1 + \frac{P(1-f_o)}{N_{PDCH}}\frac{1}{f_p}\max(\gamma_{1,p}, \gamma_{2,p})\right),$$

where $f_p$ is the fraction of the transmit power allocated to the pilot channel. To simplify the notation, let $$\zeta = \frac{P(1-f_o)}{N_{PDCH}}\frac{1}{f_p}.$$

Therefore, when only a single MS is scheduled at a time and the signal intended for the MS is transmitted over both beams, the capacity of the sector is then given by $$\text{Capacity} = N_{PDCH}\log_2(1 + \zeta\max(\gamma_{1,p}, \gamma_{2,p})).$$

In communication system 100, a separate MS, or user, is concurrently scheduled in each of the multiple beams associated with a sector, that is, beams 401 and 402 of sector 400. When the signal intended for an MS 110, 111, associated with a respective sector beam 401, 402 is transmitted only over the beam associated with the MS, the capacity of sector 400 is given by $$\text{Capacity} = N_{PDCH}\left(\alpha\log_2\left(1 + \frac{\zeta}{\alpha}\gamma_{1,p}\right) + (1-\alpha)\log_2\left(1 + \frac{\zeta}{(1-\alpha)}\gamma_{2,p}\right)\right)$$

where $\alpha$ denotes the fraction of the Walsh code space allocated to the first MS 110 and 1−$\alpha$ gives the fraction allocated to the second MS 111. Note that in this formulation, the power allocated to each Walsh code is different in the two beams 401 and 402.

The maximum achievable capacity for sector 400 is then given by $$\text{Capacity} = N_{PDCH}\log_2(1 + \zeta(\gamma_{1,p} + \gamma_{2,p})),$$

and this is achieved when $$\alpha = \frac{\gamma_{1,p}}{\gamma_{1,p} + \gamma_{2,p}}.$$

The increase in capacity resulting from the use of 2-user CDM with switched beams is thus given by $$\text{Capacity Increase} = N_{PDCH}(\log_2(1 + \zeta(\gamma_{1,p} + \gamma_{2,p})) - \log_2(1 + \zeta\max(\gamma_{1,p}, \gamma_{2,p})))$$

$$= N_{PDCH}\log_2\left(\frac{1 + \zeta(\gamma_{1,p} + \gamma_{2,p})}{1 + \zeta\max(\gamma_{1,p}, \gamma_{2,p})}\right).$$

If $\gamma_{1,p} = \gamma_{2,p}$, the increase in capacity is given by $$\text{Capacity Increase} = N_{PDCH}\log_2\left(\frac{1 + 2\zeta\gamma_{1,p}}{1 + \zeta\gamma_{1,p}}\right),$$

and this corresponds to a 3 dB increase in a signal-to-interference ratio (SIR) per Walsh code for the shared communication channel.

It may be noted that this is not a doubling of capacity. In order to double the capacity with a 3 dB increase in SIR, it is also necessary to double the number of Walsh codes (more generally, bandwidth). This could be done by allowing the use of quasi-orthogonal functions (QOF's, already in the CDMA2000 1X standard) for the packet data channel, with one set of QOF's allocated to each beam 401, 402.

As a result, by scheduling a separate MS, or user, 110, 111 in each of beams 401 and 402, wherein the signal intended for an MS associated with a given beam is transmitted only over that beam, sector 400 capacity becomes a function of the sum of the SIR's of each of the concurrently scheduled MSs, that is MSs 110 and 111, instead of a function of the max of the two SIR's. Furthermore, scheduling a separate MS, or user, in each of beams 401 and 402 provides the additional benefits of a communication system that is compatible with C/I feedback, adaptive modulation and coding (AMC), and scheduler 106 and does not cause variation in the interference into an adjacent sector or cell.

In another embodiment of the present invention, system 100 may be a CDMA 1XEV-DV system wherein BSS 102 conveys user information to each of the MSs 110-112 serviced by the BSS via a packet data channel as well as voice and data channels. The 1X voice and data is not transmitted over the packet data channel and requires some fraction of the total transmit power in each of beams 401 and 402 as well as a fraction of the total bandwidth. Also, the power required to provide 1X voice and data service is different in the two beams. Let $f_1$ and $f_2$ denote the fraction of power allocated to CDMA2000 1X voice and data (including pilot, paging, and synchronization overhead) in beams 401 and 402, respectively. For example, let $f_1 = 1/3$ and $f_2 = 2/3$. As above, let $N_{PDCH}$ denote the number of Walsh codes available for the packet data channel. Note that this number excludes Walsh codes used either for overhead channels such as pilot, paging, and synchronization channels, as well as Walsh codes allocated for 1X voice and/or data.

Without CDM, when only a single MS, or user, is scheduled to receive an informational signal and the signal is transmitted over both beams (or transmitted only over the scheduled MS's beam with CDMA noise of equal power transmitted over the other beam) and the maximum capacity that can be achieved for the sector is given by $$\text{Capacity} = N_{PDCH} \log_2(1 + \zeta \max((1-f_2)\gamma_{1,p}, (1-f_2)\gamma_{2,p})),$$

where $\zeta$ is defined as above.

Again referring to FIG. 4, in communication system 100 a separate MS, or user, is concurrently scheduled in each of the multiple beams associated with a sector, that is, beams 401 and 402 of sector 400. That is, a first MS, such as MS 110, is scheduled to receive an information signal via a first beam, such as beam 401, and a second MS, such as MS 111, is scheduled to receive an information signal via a second beam, such as beam 402. Furthermore, an informational signal intended for a particular MS is transmitted to the MS only over the associated beam. The capacity of sector 400 is then given by $$\text{Capacity} = N_{PDCH}\left(\alpha \log_2\left(1 + \frac{\zeta(1-f_1)}{\alpha}\gamma_{1,p}\right) + (1-\alpha)\log_2\left(1 + \frac{\zeta(1-f_2)}{(1-\alpha)}\gamma_{2,p}\right)\right)$$

where $\alpha$ denotes the fraction of the $N_{PDCH}$ Walsh codes allocated to the first MS 110 in the first beam 401 and $1-\alpha$ denotes the fraction of the codes allocated to the second MS 111 in the second beam 402. The maximum achievable capacity is then given by $$\text{Capacity} = N_{PDCH}\log_2(1 + \zeta((1-f_1)\gamma_{1,p} + (1-f_2)\gamma_{2,p})),$$

and is achieved when $$\alpha = \frac{(1-f_1)\gamma_{1,p}}{(1-f_1)\gamma_{1,p} + (1-f_2)\gamma_{2,p}}.$$

Thus, switched beams provide similar benefits in a mixed system with both 1X voice and data and the shared communication channel as in a system using only the shared communication channel. As above, the scheduling of separate users for each beam of the multiple switched beams results in sector capacity that is a function of the sum of the SIR's of each of MS 110 and MS 111, scaled by the fraction of the beam power available for the shared communication channel, instead of a function of the max of the two SIR's. Also, once again, scheduling a separate MS, or user, in each of beams 401 and 402 provides the additional benefits of a communication system that is compatible with C/I feedback, adaptive modulation and coding (AMC), and scheduler 106 and does not cause variation in the interference into an adjacent sector or cell.

The results of scheduling of separate users for each beam of the multiple switched beams can be extended directly to systems supporting more than beams per sector and/or support of more than two CDM users per sector. As noted above, HSDPA supports 4-user CDM and the ideas presented here can be applied directly to HSDPA. For example, with four switched beams in a sector along with the 4-user CDM supported by HSDPA, the SIR per Walsh code can be increased by up to 6 dB.

Figure 5:
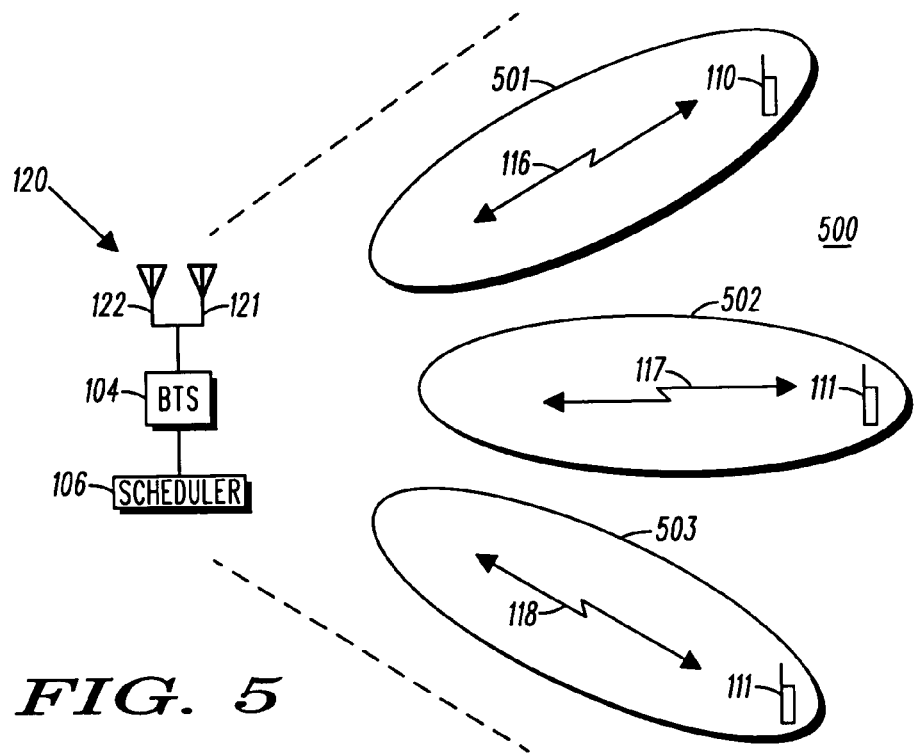
FIG. 5 is a block diagram of a sector of communication system in accordance with another embodiment of the present invention.

In yet another embodiment of the present invention, the scheduling of separate users for each beam of the multiple switched beams may be extended to shared communication channels that support the code division multiplexing of more than two users, such as the HSDPA shared packet data channel. FIG. 5 is a block diagram of a sector 500 of communication system 100 in accordance with another embodiment of the present invention. As depicted in FIG. 5, sector 500 in includes three beams 501-503. Let $\gamma_{1,p}$ denote the pilot C/I for a first MS, such as MS 110, located in a first beam 501, $\gamma_{2,p}$ denote the pilot C/I for a second MS, such as MS 111, located in a second beam 502, and $\gamma_{3,p}$ denote the pilot C/I for a third MS, such as MS 112, which MS is now located in a third beam 503 in the same sector as MSs 110 and 111.

As above, let $N_{PDCH}$ denote the number of Walsh codes allocated to a shared communication channel, preferably a shared packet data channel that is transmitted over each air interface 116-118. Let P denote the total transmit power allocated to the sector. Let $f_0$ denote the fraction of the total power allocated to overhead channels, such as pilot, paging, and synchronization channels. The power allocated to each beam is constant and equal to P/3. In this way, the C/I information at each MS 110-112 located in a respective beam 501-503 varies only as a function of the fading, and not due to fluctuations in the transmitted power.

If only a single user at a time is scheduled for the sector and the signal is transmitted over all three beams (or transmitted only over the scheduled user's beam with CDMA noise of equal power transmitted over the other beams), the maximum capacity that can be achieved for the sector is given by $$\text{Capacity} = N_{PDCH}\log_2\left(1 + \frac{P(1-f_o)}{N_{PDCH}}\frac{1}{f_p}\max(\gamma_{1,p}, \gamma_{2,p}, \gamma_{3,p})\right)$$

$$= N_{PDCH}\log_2(1 + \zeta\max(\gamma_{1,p}, \gamma_{2,p}, \gamma_{3,p})),$$

where $f_p$ and $\zeta$ are defined as above.

In the embodiment of communication system 100 illustrated by FIG. 5, a separate MS 110-112 is respectively scheduled in each beam 501-503 in sector 500. Furthermore, an informational signal intended for an MS 110-112 located in a respective beam 501-503 is transmitted only over that beam. A capacity of sector 500 is then given by $$\text{Capacity} = N_{PDCH}\left(\alpha\log_2\left(1 + \frac{\zeta}{\alpha}\gamma_{1,p}\right) + \beta\log_2\left(1 + \frac{\zeta}{\beta}\gamma_{2,p}\right) + (1-\alpha-\beta)\log_2\left(1 + \frac{\zeta}{1-\alpha-\beta}\gamma_{2,p}\right)\right)$$

where α is the fraction of the Walsh codes allocated to beam 501, β is the fraction of the Walsh codes allocated to beam 502, and 1−α−β is the fraction of Walsh codes allocated to beam 503. The maximum achievable capacity of sector 500 is then given by $$\text{Capacity} = N_{PDCH}\log_2(1+\zeta(\gamma_{1,p}+\gamma_{2,p}+\gamma_{3,p})),$$

and this is achieved when $$\alpha = \frac{\gamma_{1,p}}{\gamma_{1,p}+\gamma_{2,p}+\gamma_{3,p}} \text{ and } \beta = \frac{\gamma_{2,p}}{\gamma_{1,p}+\gamma_{2,p}+\gamma_{3,p}}.$$

Although the above is described with respect to three beams 501-503 in sector 500, those who are of ordinary skill in the art realize that the above improvement in system capacity by concurrent assignment of a separate beam to each of multiple MSs can easily be extended to any number of beams in sector 500.

In still another embodiment of the present invention, the shared communication channel may support a code division multiplexing of more than two MSs, or users, and operates in a system with CDMA2000 1X voice and data. In particular, suppose the shared communication channel supports the code division multiplexing of three MSs, or users, 110-112 although those who are of ordinary skill in the art realize that the results can easily be extended to an arbitrary number of MSs, or CDM users.

The 1X voice and data is not transmitted over the shared communication channel and requires some fraction of the total transmit power in each beam as well as a fraction of the total bandwidth. Referring again to FIG. 5, let $f_1$, $f_2$, and $f_3$ denote the fraction of power allocated to CDMA2000 1X voice and data (including pilot, paging, and synchronzation channel overhead) in beams 501, 502, and 503 respectively. As before, let $N_{PDCH}$ denote the number of Walsh codes available for the shared communication channel. Note that this number excludes Walsh codes used either for overhead channels such as pilot, paging, synchronization channels, as well as Walsh codes allocated for 1X voice and/or data.

Without CDM, if only a single user is scheduled to receive a user information signal in a sector and the signal is transmitted over all three beams (or transmitted only over the scheduled user's beam with CDMA noise of equal power transmitted over the other beams), the maximum capacity that can be achieved for the sector is given by $$\text{Capacity} = N_{PDCH}\log_2(1+\zeta\max((1-f_1)\gamma_{1,p},(1-f_2)\gamma_{2,p},(1-f_3)\gamma_{3,p})),$$

where ζ is defined as above.

With CDM, as depicted in FIG. 5, a separate MS, or user, 110-112 may be scheduled in each of the three beams 501-503 in sector 500. In addition, an informational signal intended for each MS 110-112 is transmitted to the MS only over the beam associated with the MS. The capacity of sector 500 is now given by $$\text{Capacity} = N_{PDCH}\left(\begin{array}{l}\alpha\log_2\left(1 + \frac{\zeta(1-f_1)}{\alpha}\gamma_{1,p}\right) + \\ \beta\log_2\left(1 + \frac{\zeta(1-f_2)}{\beta}\gamma_{2,p}\right) + \\ (1-\alpha-\beta)\log_2\left(1 + \frac{\zeta(1-f_2)}{(1-\alpha-\beta)}\gamma_{2,p}\right)\end{array}\right)$$

where, as before, α is the fraction of the Walsh codes allocated to beam 501, β is the fraction of the Walsh codes allocated to beam 502, and 1-α-β is the fraction of Walsh codes allocated to beam 503. The maximum achievable capacity for sector 500 is then given by $$\text{Capacity} = N_{PDCH}\log_2(1+\zeta((1-f_1)\gamma_{1,p}+(1-f_2)\gamma_{2,p}+(1-f_3)\gamma_{3,p})),$$

and is achieved when $$\alpha = \frac{(1-f_1)\gamma_{1,p}}{(1-f_1)\gamma_{1,p}+(1-f_2)\gamma_{2,p}+(1-f_3)\gamma_{3,p}}, \text{ and}$$

$$\beta = \frac{(1-f_2)\gamma_{2,p}}{(1-f_1)\gamma_{1,p}+(1-f_2)\gamma_{2,p}+(1-f_3)\gamma_{3,p}}.$$

Thus, switched beams provide similar benefits in a mixed system with both 1X voice and data and the shared communication channel as in a system using only the shared communication channel.

Figure 6:
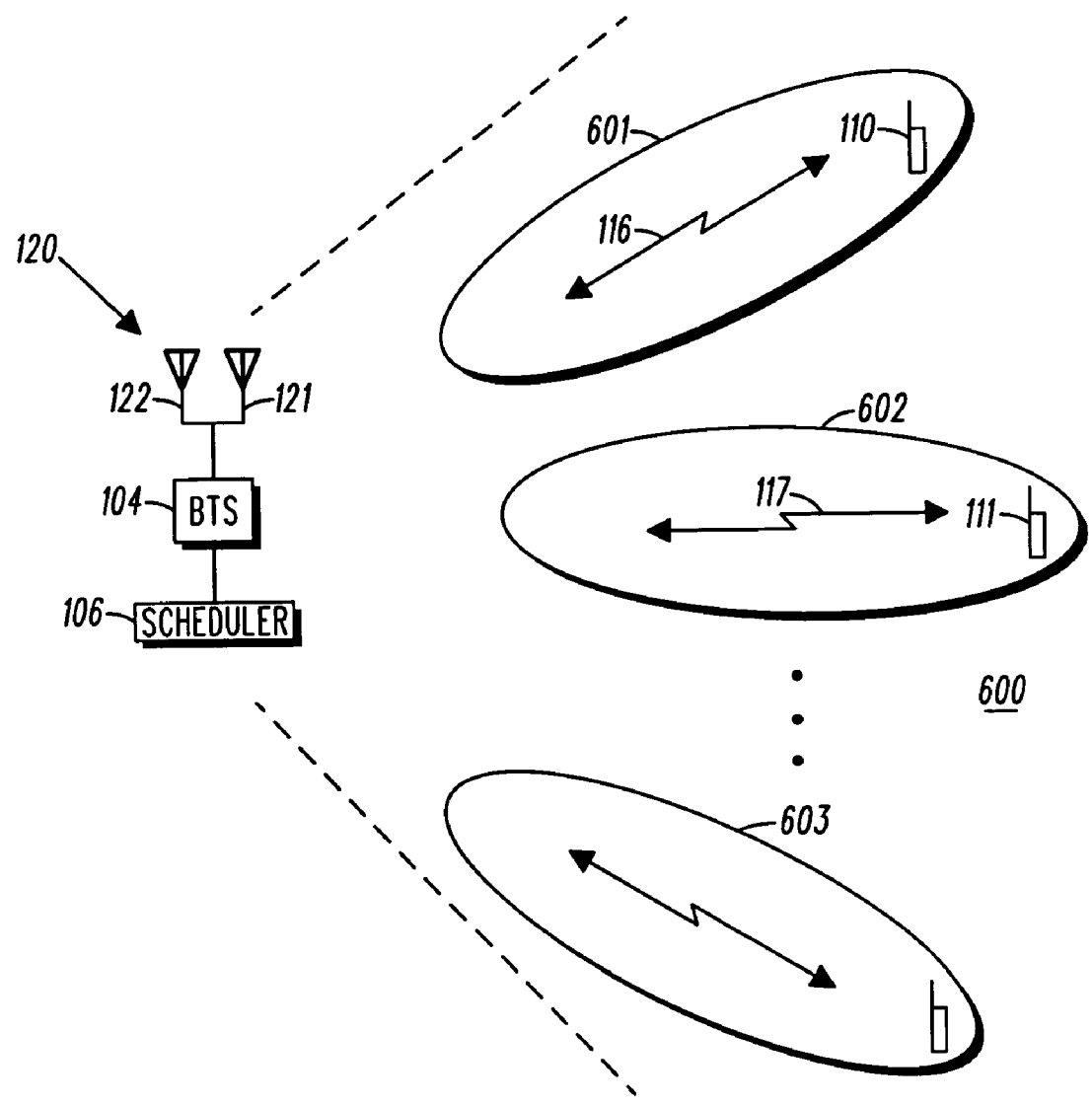
FIG. 6 is a block diagram of a sector of communication system in accordance with another embodiment of the present invention.

Referring now to FIG. 6, another embodiment of the present invention is depicted wherein a sector 600 of communication system 100 is partitioned into K beams 601-603, where K is greater than 2. The notation follows from above. Let $\gamma_{1,p}$ denote the C/I of an MS, or user, associated with a beam i (either the user with the highest C/I in the beam or a user selected by some other criteria), such as MS, or user, 110 in beam 601. Let ζ be defined as above so that $$\zeta = \frac{P(1-f_o)}{N_{PDCH}}\frac{1}{f_p}$$

where P is the total power allocated to the sector, $f_p$ is the fraction of this power allocated to the pilot, $N_{PDH}$ is the number of Walsh codes allocated to the shared communication channel, and $f_0$ denotes the power allocated to the overhead channels such as pilot, paging and synchronization channels.

Let $f_i$ denote a fraction of the total power allocated to a beam i that is currently assigned to voice and 1X data in the beam. Assume that the transmit power is to be equally divided over the K beams 601-603 at all times, so that the power per beam is P/K.

Without the use of CDM, if only a single user is scheduled to receive a user information signal in a sector and the signal is transmitted over all three beams (or transmitted only over the scheduled user's beam with CDMA noise of equal power transmitted over the other beams), the maximum capacity that can be achieved for the sector is given by Capacity=$N_{PDCH} \log_2(1+\zeta \max((1-f_1)\gamma_{1,p}, (1-f_2)\gamma_{2,p}, \ldots, (1-f_K)\gamma_{K,p}))$ and this maximum capacity is achieved if we schedule use of the shared packet data channel by a user i* for which the product $(1-f_i)\gamma_{i,p}$ is maximum, and allocate all of the Walsh codes $N_{PDCH}$ and the available power $(1-f_{i*})$ P/K to the user in an associated beam i*.

With the use of 2-user CDM, the maximum capacity that can be achieved for the sector is given by Capacity=$N_{PDCH} \log_2(1+\zeta((1-f_{i*})\gamma_{i*,p}+(1-f_{j*})\gamma_{j*,p}))$, where i* and j* are two MSs, or users (in associated beams i* and j*), such as MSs 110 and 111 in associated beams 601 and 602, located in sector 600 for which the product $(1-f_i)\gamma_{i,p}$ are maximum, and this capacity is achieved when the fraction α* of the $N_{PDCH}$ Walsh codes allocated to MS (beam) i* is given by $$\alpha^* = \frac{(1-f_1)\gamma_{i*,p}}{(1-f_1)\gamma_{i*,p} + (1-f_2)\gamma_{j*,p}},$$

and the fraction of Walsh codes allocated to MS (beam) j* is (1−α*).

If MSs, or users, k and l are scheduled (not necessarily the MSs, or users, i* and j*), the maximum capacity that can be achieved is given by Capacity=$N_{PDCH} \log_2(1+\zeta((1-f_k)\gamma_{k,p}+(1-f_l)\gamma_{l,p}))$, and this capacity is achieved only when a fraction a of the $N_{PDCH}$ Walsh codes is allocated to MS k, and the remaining fraction (1−α) are allocated to MS l, where α is given by $$\alpha = \frac{(1-f_k)\gamma_{k,p}}{(1-f_k)\gamma_{k,p} + (1-f_l)\gamma_{l,p}}$$

In still other embodiments of the present invention, communication system 100 may assign other uses to beams that do not include an MS, or user, that is currently assigned to the shared communication channel in order to optimize system capacity. In one such embodiment, the portion of the shared communication channel assigned to one of such a beam's neighboring beams may be transmitted in this beam with power equal to the power available for the packet data channel in this beam. In another such embodiment, an entire shared control channel, that is, a shared packet data control channel, (the sum signal for the two CDM-ed users) may be transmitted over such a beam with power equal to the power available to the packet data channel in the beam. In yet another such embodiment, a randomly modulated bit stream may be transmitted in such a beam using an unused Walsh code with power equal to the power available to the packet data channel in this beam.

In still another embodiment of the present invention, when communication system 100 is a CDMA2000 1xEV-DV communication system that includes multiple control channels such as a first Packet Data Control Channel (PDCCH) and a second Packet Data Control Channel (PDCCH), the first PDCCH may be transmitted to all beams (and only these beams) with MSs currently assigned to the shared packet data channel (PDCH). The second PDCCH is then transmitted only to the beam with the target user for this second PDCCH.

In yet another embodiment of the present invention, communication system 100 may transmit CDMA noise (randomly modulated unused Walsh code) on a shared communication channel in order to keep the transmitted power in each of the beams equal and constant and preserve the integrity of the C/I feedback. Transmission of noise may be desirable if either there is no data to transmit on the shared communication channel during some time intervals or there are two beams for the shared packet data channel, but there are four beams for 1X voice and data. In this instance, only one of the two of the four beams may be scheduled for the shared communication channel, the other two beams must be filled with noise.

In still other embodiments of the present invention, it may be desirable to allocate different fractions of the sector total transmit power to the beams (rather than equal power). This approach may be useful when the average traffic is unevenly distributed within the beams. It may also be desirable to use beams of different width for the same reason—that is, to serve a traffic demand that has a non-uniform angular distribution. Both techniques can also be combined—that is, the power levels of the beams may be unequal, and the widths of the beams may be unequal. In all cases, the allocation of the Walsh codes between the users in the different beams can be allocated so as to maximize the theoretical capacity in a manner similar to that given above. More specifically, the power per beam can be maintained at an approximately fixed level, while the Walsh codes of the shared packet data channel are allocated so as to maximize the capacity. Preferably, while the power distribution among the beams may not be equal, the power levels of the beams should be held approximately constant so as not to disrupt the C/I feedback from the mobiles. If the power levels of the beams are changed, they should be changed infrequently or at a low rate, since changing these power levels disturbs the C/I feedback.

In summary, in order to increase a capacity, or a number of MSs or users, that may engaged in concurrent communication sessions, communication system 100 schedules a different MS, or user, in each beam of the multiple beams associated with a coverage area, in particular a sector. By simultaneously scheduling a user in each beam of the multiple beams, a performance and throughput of communication system 100 is significantly increased over the prior art. In one embodiment of the present invention, a portion of a communication channel that is shared among multiple MSs located in the sector, such as a shared packet data channel, is allocated to each MS scheduled in a beam. The portion of the shared communication channel allocated to each MS is then concurrently transmitted to each MS via the beam associated with the MS. In other embodiments of the present invention, wherein one or more MSs located in a sector share the shared communication channel and other MSs located in the sector do not utilize the shared communication channel, noise may be transmitted in a portion of the shared communication channel transmitted to the latter MSs. In yet other embodiments of the present invention, voice channels, data channels, and control channels associated with each MS scheduled in a beam may be concurrently transmitted to each MS via the beam associated with the MS. In still other embodiments of the present invention, communication system 100 may distribute the total transmitted power allocated to the sector approximately equally among the multiple beams associated with the sector or in an unequal fashion among the multiple beams. By individually adjusting a power of the signals transmitted in each beam, a quality of the received signals may be optimized and interference resulting from transmission of signals in multiple beams in a same sector may be minimized.

Figure 7:
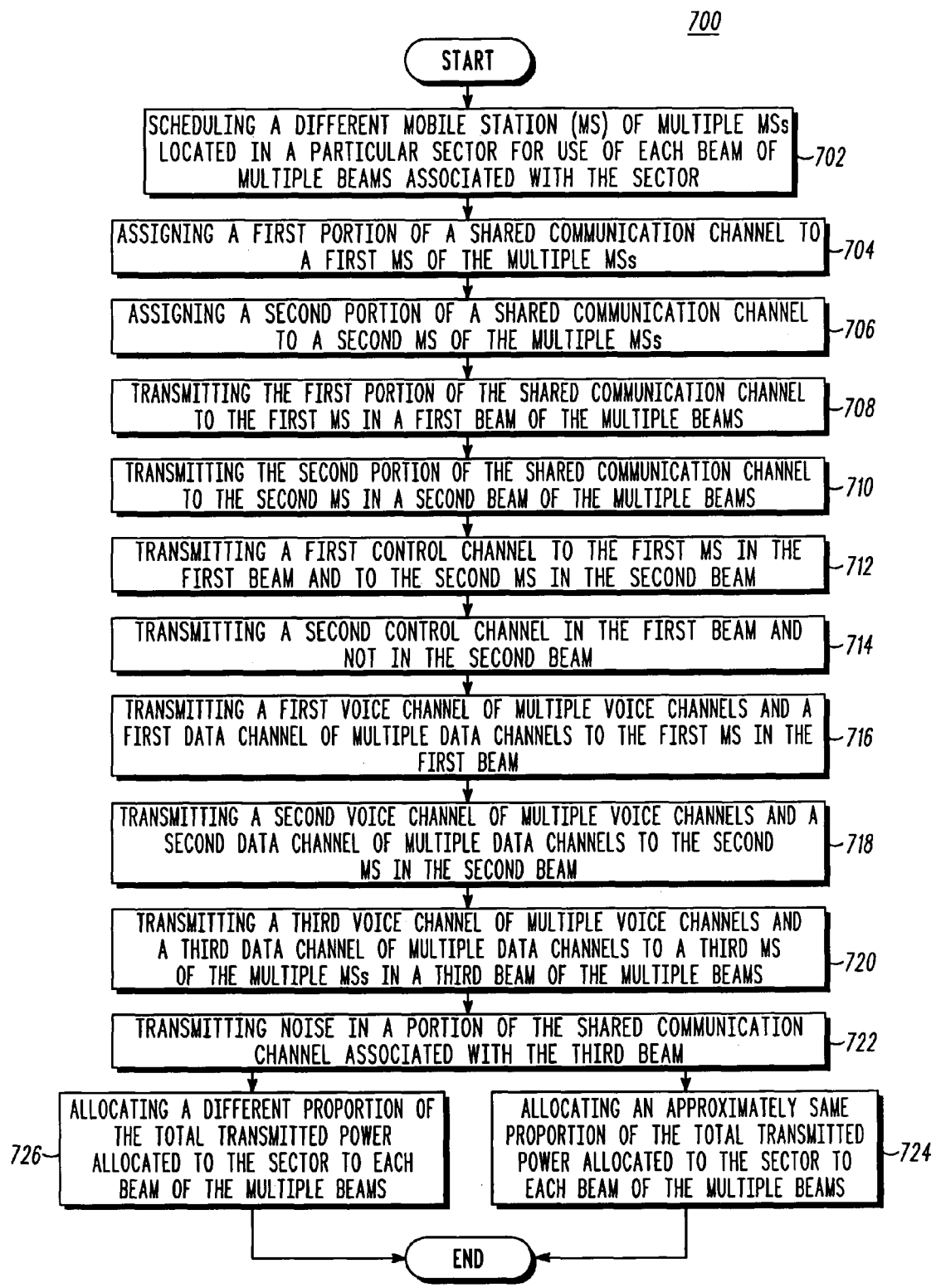
FIG. 7 is a logic flow diagram of steps executed by a communication system in conveying information to each mobile station of multiple mobile stations via a switched beam antenna system in accordance with an embodiment of the present invention.

FIG. 7 is a logic flow diagram 700 of steps executed by communication system 100 in conveying information to each MS of multiple MS 110, 111 via a switched beam antenna system. Logic flow diagram 700 begins when communication system 100, preferably scheduler 106, schedules (702) a different MS of multiple MSs located in a particular sector serviced by a BSS, such as MSs 110-111 (two shown) located in sector 151 serviced by BSS 102, for use of each beam of multiple beams 160, 161 (two shown) associated with that sector. For example, a first MS 110 of the multiple MS's 110, 111 may be scheduled for use of a first beam 160 and a second MS 111 of the multiple MS's 110, 111 may be scheduled for use of a second beam 161. BSS 102 communicates with each MS of the multiple MSs 110, 111 via a respective air interface 116, 117. When each air interface 116, 117 includes a shared communication channel, such as a shared packet data channel, communication system 100, preferably BSS 102, assigns (704) a first portion of the shared communication channel to first MS 110 and assigns (706) a second portion of the shared communication channel to the second MS 111. BSS 102, and in particular a BTS servicing each MS, then transmits (708) the first portion of the of the shared communication channel to the first MS 110 in the first beam 160 and transmits (710) the second portion of the shared communication channel to the second MS 111 in the second beam 161.

When communication system 100 is a CDMA communication system, the shared communication channel may comprise multiple orthogonal codes. In such an event, the step of assigning (704) a first portion of the shared communication channel to the first MS 110 may comprise a step of assigning a first set of orthogonal codes of the multiple orthogonal codes to the first MS 110, and the step of assigning (706) a second portion of the shared communication channel to the second MS 111 may comprise a step of assigning a second set of orthogonal codes of the multiple orthogonal codes to second MS 111. The steps of transmitting (708, 710) the first and second portions of the shared communication channel to the first and second MSs 110, 111 in each MS's respective beam 160, 161 then respectively comprise steps of transmitting the first set of orthogonal codes to the first MS 110 in the first beam 160 and transmitting the second set of orthogonal codes to the second MS 111 in the second beam 161. The first set of orthogonal codes and the second set of orthogonal codes may each comprise a same proportion of the multiple orthogonal codes or may each comprise a different proportion of the multiple orthogonal codes.

In another embodiment of the present invention, communication system 100, that is, each air interface 116, 117 between BSS 102 and MS's 110 and 111, may further include a control channel, preferably a packet data control channel. In such an embodiment, logic flow 700 may further include a step of transmitting (712), by a BTS 104, 105 servicing each MS, the control channel to each of the first MS 110 in the first beam 160 and to the second MS 111 in the second beam 161. In yet another embodiment of the present invention, communication system 100 may further include multiple control channels, preferably multiple packet data control channels. In such an embodiment, the step of transmitting (712), by a BTS servicing each MS, a control channel to each of the first MS 110 in the first beam 160 and to the second MS 111 in the second beam 161 may comprise a step of transmitting a first control channel of the multiple packet data control channels to each of the first MS 110 and the second MS via respective beams 160 and 161. Logic flow 700 may then further include a step of transmitting (714), by a BTS servicing each MS, a second control channel of the multiple control channels in the first beam 160 but not in the second beam 161.

In still another embodiment of the present invention, communication system 100, that is, each air interface 116, 117 between BSS 102 and MSs 110 and 111, may further include multiple voice channels and multiple data channels. In such an embodiment, logic flow diagram 700 may further include steps of transmitting (716), by a BTS servicing the MS, a first voice channel of the multiple voice channels and a first data channel of the multiple data channels to MS 110 in the first beam 160 and transmitting (718), by a BTS servicing the MS, a second voice channel of the multiple voice channels and a second data channel of the multiple data channels to the second MS 111 in the second beam 161. In yet another embodiment of the present invention, logic flow diagram 700 may further steps of transmitting (720), by a BTS servicing the MS, a third voice channel of the multiple voice channels and a third data channel of the multiple data channels in a third beam of the multiple beams associated with sector 151 and transmitting (722) noise in a portion of the shared communication channel associated with the third beam.

In still other embodiments of the present invention, different proportions of the total transmitted power allocated to sector 151 may be allocated to each of the multiple beams 160, 161 associated with the sector. For example, in one embodiment of the present invention, BSS 102 or a BTS servicing each MS, may allocate (724) a same proportion of the total transmitted power allocated to sector 151 to each of the multiple beams 160, 161. When the sets of orthogonal codes transmitted in each beam are different in size, then a result of allocating a same proportion of the total transmitted power to each of the multiple beams may be an allocation of a different transmitted power to each orthogonal code. However, it is not necessary that each beam be allocated a same proportion of the total transmitted power and in another embodiment of the present invention, BSS 102 or a BTS servicing each MS may allocate (726) each beam of the multiple beams 160, 161 a different proportion of a total transmitted power allocated to sector 151.

By scheduling a different MS, or user, in each beam of the multiple beams associated with a coverage area, in particular a sector, communication system 100 increases a capacity, or a number of mobile stations (MSs), or users, that may engaged in concurrent communication sessions. Each MS of multiple MSs located a coverage area, preferably a sector, is scheduled for a different beam of the multiple beams asocited with that sector. In simultaneously scheduling each MS of the multiple MSs in each beam of the multiple beams, a performance and throughput of communication system is significantly increased over the prior art. Furthermore, by simultaneously scheduling each MS of the multiple MSs in each beam of the multiple beams, shared communication channels, voice channels, data channels, and control channels associated with each MS scheduled in a beam may be concurrently transmitted to the multiple MSs via the beams associated with each MS. In addition, the power of the signals transmitted in each beam may be individually aligned so as to optimize the quality of the received signal and minimize interference resulting from transmission of signals in multiple beams in a same sector.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for allocating a shared communication channel among a plurality of beams in a communication system comprising a switched beam antenna system, wherein the shared communication channel comprises a plurality of orthogonal codes and wherein the method comprises:
measuring a quality of a propagation channel associated with each beam of the plurality of beams; and
allocating a first portion of the plurality of orthogonal codes to a first beam of the Plurality of beams and a second portion of the plurality of orthogonal codes to a second beam of the plurality of beams, wherein the first and second portions are a function of the measured quality of the propagation channels between a base station and mobile stations in the first beam and between the base station and mobile stations in the second beam.

2. The method of claim 1, further comprising:
scheduling a first mobile station for the first beam;
scheduling a second mobile station for the second beam;
transmitting the first portion of the plurality of orthogonal codes to the first mobile station via in the first beam; and
transmitting the second portion of the plurality of orthogonal codes to the second mobile station via the second beam;
where the first and second portions of the plurality of orthogonal codes are based on the measured quality of the propagation channels between the base station and the first mobile station in the first beam and the quality of the propagation channel between the base station and the second mobile station in the second beam.

3. The method of claim 2, wherein the communication system further comprises a control channel and wherein the method further comprises a step of transmitting the control channel in each of the first beam and the second beam.

4. The method of claim 3, wherein the control channel comprises a first control channel, wherein the communication system further comprises a second control channel that is associated with the second mobile station and not with the first mobile station, and wherein the method further comprises a step of transmitting the second control channel in the second beam but not in the first beam.

5. The method of claim 2, wherein the communication system further comprises a plurality of voice channels and shared data channel and wherein the method further comprises steps of:
transmitting a plurality of voice channels and a portion of the orthogonal codes corresponding to the shared data channel in the first beam; and
transmitting a plurality of voice channels and a portion of the orthogonal codes corresponding to the shared data channel in the second beam.

6. The method of claim 2, further comprising:
maintaining an approximately constant transmit power for the shared communication channel in the first beam; and
maintaining an approximately constant transmit power for the shared communication channel in the second beam.

7. The method of claim 1, wherein the communication system is divided into a plurality of geographic sectors, and wherein each beam of the plurality of beams is transmitted in a same sector of the plurality of sectors.

8. The method of claim 7, further comprising a step of allocating to each beam of the plurality of beams an approximately same proportion of a total transmitted power allocated to the sector that includes the beams.

9. The method of claim 7, further comprising a step of allocating to each beam of the plurality of beams a different proportion of a total transmitted power allocated to the sector that includes the beams than the proportion of the total transmitted power allocated to the other beams of the plurality of beams, where the proportions reflect the average traffic loads within the beams.

10. The method of claim 1, further comprising:
transmitting user information via the shared communication channel and the first beam; and
concurrent with the transmission of the user information, if no demand for the shared channel exists in the second beam for a given time slot, transmitting the same shared data channel transmission in the second beam as in the first beam.

11. The method of claim 10, further comprising maintaining a transmit power associated with the first beam approximately equal to a transmit power associated with the second beam.

12. The method of claim 1, further comprising:
transmitting user information via the shared communication channel and the first beam; and
concurrent with the transmission of the user information, if no demand for the shared channel exists in the second beam for a given time slot, transmitting noise in the second beam using the orthogonal codes of the shared data channel unused by the first beam.

13. The method of claim 1, further comprising maintaining a transmit power associated with the first beam approximately equal to a transmit power associated with the second beam.

14. In a communication system comprising a switched beam antenna system that generates a plurality of predetermined, fixed beams, a base station subsystem comprising:
an antenna array comprising a plurality of array elements;
a processor that comprises an orthogonal code generator that generates a plurality of orthogonal codes, wherein the plurality of orthogonal codes are allocated to a shared communication channel, wherein the processor allocates a first portion of the plurality of orthogonal codes to a first array element of the plurality of array elements and allocates a second portion of the plurality of orthogonal codes to a second array element of the plurality of plurality of array elements, wherein the processor allocates the plurality of orthogonal codes to the first and second array elements based on a propagation channel quality measurement associated with a first beam of the plurality of fixed beams and a propagation channel quality measurement associated with a second beam of the plurality of fixed beams, and wherein each of the first portion of the plurality of orthogonal codes and the second portion of the plurality of orthogonal codes are transmitted via one or more array elements of the plurality of array elements.

15. The base station subsystem of claim 14, further comprising a scheduler that assigns the first beam to a first mobile station and assigns the second beam to a second mobile station.

16. The base station subsystem of claim 15, wherein the processor maintains an approximately constant transmit power for the shared communication channel in the first beam and maintains an approximately constant transmit power for the shared communication channel in the second beam.

17. The base station subsystem of claim 14, wherein the base station subsystem further transmits a control channel in each of the first beam and the second beam.

18. The base station subsystem of claim 17, wherein the control channel comprises a first control channel and wherein the base station subsystem further transmits a second control channel in the second beam but not in the first beam.

19. The base station subsystem of claim 14, wherein the base station subsystem further transmits a plurality of voice channels and a first data channel of a portion of the orthogonal codes corresponding to the shared data channel in the first beam and transmits a plurality of voice channels and a portion of the orthogonal codes corresponding to the shared data channel in the second beam.

20. The base station subsystem of claim 14, wherein the station subsystem operates in a communication system that is divided into a plurality of geographic sectors and wherein each beam of the plurality of beams is transmitted in a same sector of the plurality of sectors.

21. The base station subsystem of claim 20, wherein the base station subsystem allocates a total transmitted power to the sector that includes the beams and wherein the base station subsystem further suballocates to each beam of the plurality of beams an approximately same proportion of a total transmitted power allocated to the sector that includes the beams.

22. The base station subsystem of claim 20, wherein the base station subsystem allocates a total transmitted power to the sector that includes the beams and wherein the base station subsystem further sub-allocates to each beam of the plurality of beams a different proportion of a total transmitted power allocated to the sector that includes the beams than the proportion of the total transmitted power allocated to the other beams of the plurality of beams, where the proportions reflect the average traffic loads within the beams.

23. The base station subsystem of claim 14, wherein the base station subsystem further comprises a plurality of weighters, wherein each weighter of the plurality of weighters is coupled to the processor and is further coupled to an array element of the plurality of array elements, and wherein the processor conveys a plurality of sets of weighting coefficients to the weighters, wherein a first set of weighting coefficients of the plurality of sets of weighting coefficients are utilized by the weighters to transmit via the first array element and wherein a second set of weighting coefficients of the plurality of sets of weighting coefficients are utilized by the weighters to transmit via the second array element.

24. The base station subsystem of claim 14, wherein the base station subsystem transmits user information via the shared communication channel and the first beam and, concurrent with the transmission of the user information, if no demand for the shared channel exists in the second beam for a given time slot, transmits the same shared data channel transmission in the second beam as in the first beam.

25. The base station subsystem of claim 14, wherein the base station subsystem transmits user information via the shared communication channel and the first beam and, concurrent with the transmission of the user information, if no demand for the shared channel exists in the second beam for a given time slot, transmits noise in the second beam using the orthogonal codes of the shared data channel unused by the first beam.

26. The base station subsystem of claim 14, wherein the base station subsystem maintains a transmit power associated with the first beam approximately equal to a transmit power associated with the second beam.

* * * * *